Figure 1:
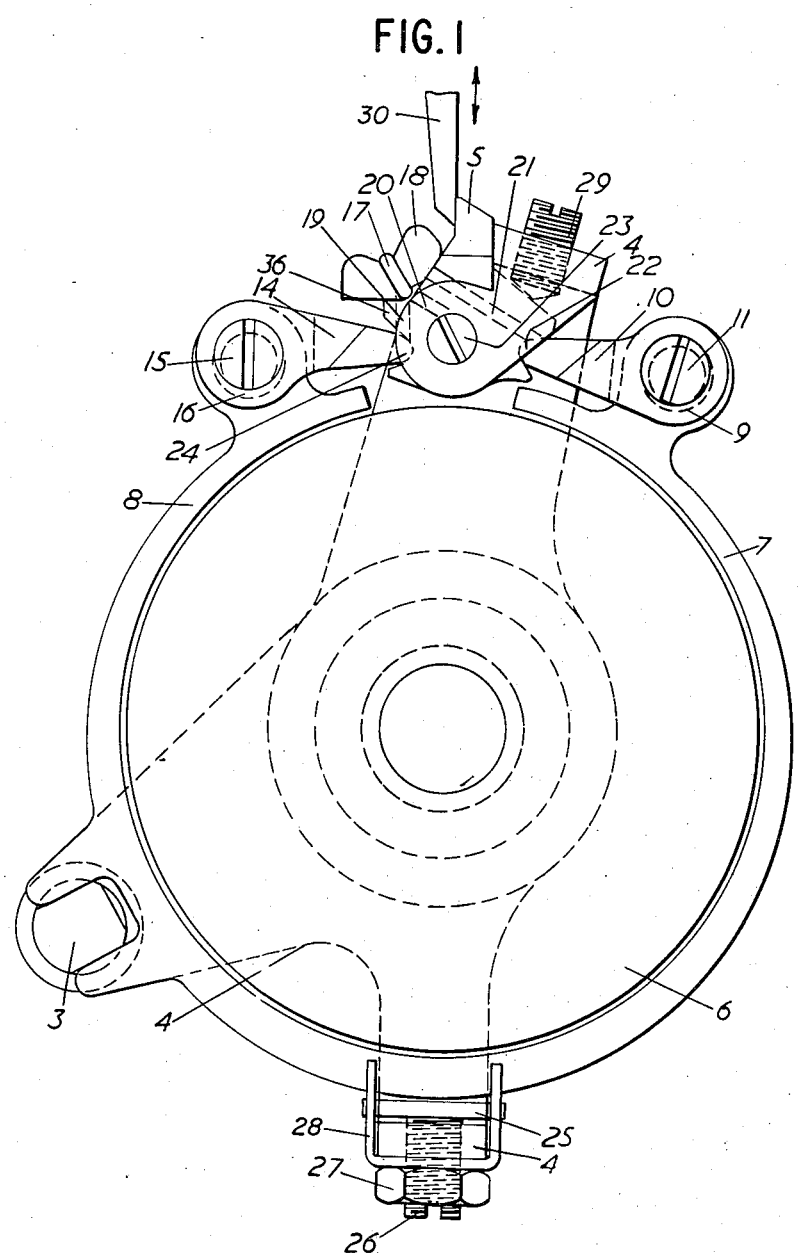

June 6, 1961        J. HANDLEY        2,987,157
TELEPRINTER CLUTCHES

Filed March 5, 1958        3 Sheets-Sheet 1

Inventor
J. HANDLEY
By /s/ Morris
Attorney

June 6, 1961  J. HANDLEY  2,987,157
TELEPRINTER CLUTCHES
Filed March 5, 1958  3 Sheets—Sheet 3

*Inventor*
John Handley

By *Vincent Henninger*
Agent

United States Patent Office 2,987,157
Patented June 6, 1961

2,987,157
TELEPRINTER CLUTCHES
John Handley, Purley, England, assignor to Creed & Company Limited, Croydon, England, a British company
Filed Mar. 5, 1958, Ser. No. 719,385
Claims priority, application Great Britain Mar. 27, 1957
2 Claims. (Cl. 192—80)

This invention relates to friction clutches and more particularly, but not exclusively, to such clutches for use in printing telegraph apparatus.

It is known to provide a friction clutch in which a spring band mounted on a driven member may be allowed to contract to grip a constantly rotating driving member or may be expanded to release its grip on the driving member. In such an arrangement the driven member has always hitherto been attached to the spring band at or near one end of the band.

In the known arrangements, if the driven member is attached to the end of the spring band which is the trailing or rearmost portion of the band, which is the usual arrangement, then, immediately after the spring band has been allowed to contract to engage the driving member, when the driven member is being accelerated from rest to the correct speed of rotation, the spring band is caused to grip the driving member more tightly than it would naturally do of itself. This effect of gripping more tightly when there is a difference in speed between the driving and driven members will be referred to in this specification as servo action.

Again, in the case where the driven member is attached to the rear end of the spring band, if the driven member is accelerated through the correct rotational speed, there will be no servo action present and the tendency will in fact be for the natural grip of the spring band on the driving member to be reduced and for over-run to take place.

If the driven member is attached to the leading edge of the spring band, then the position is reversed. Servo action will be present to prevent over-run, but will not be present immediately after the initial engagement of the clutch and the driven member will not be accelerated to the correct speed of rotation in the shortest possible time.

In printing telegraph apparatus it is particularly important that a driven member such as a cam sleeve shall be driven at the correct speed. In such apparatus in which cam followers are spring-urged into contact with cams on a cam sleeve driven through a friction clutch, a force is exerted by the cam followers sometimes tending to retard the cam sleeve and sometimes tending to make it over-run. An example of this type of apparatus is shown in our co-pending U.S. applications Nos. 483,313, filed January 21, 1955, and 704,583, filed December 23, 1957, now U.S. Patent No. 2,944,111, in which such cam followers are used to position a type carrier through an aggregate motion mechanism. Again, such forces must not be allowed to affect the speed at which the cam sleeve is driven. It is accordingly an object of the present invention to provide a friction clutch in which there is servo action in both directions and the driven member may be enabled to attain the correct speed almost instantaneously, and there is no danger of over-run or retardation when forces are exerted which give a change of torque on the driven member.

According to the present invention there is provided a friction clutch comprising a spring band mounted on a driven member and arranged to engage frictionally a driving member, the mounting of the spring band on the driven member being made at a point on the spring band so situated that the spring band is divided thereby into two lengths defining a front portion and a rear portion, the front portion having a ratio to the rear portion greater than 1:1 but not greater than 3:1, and means situated between the ends of the spring band and operable through a lever stop arm for expanding the spring band to release the said engagement.

In this connection the term "length" is defined to mean the distance along the circumference of the spring band.

Figure 2:
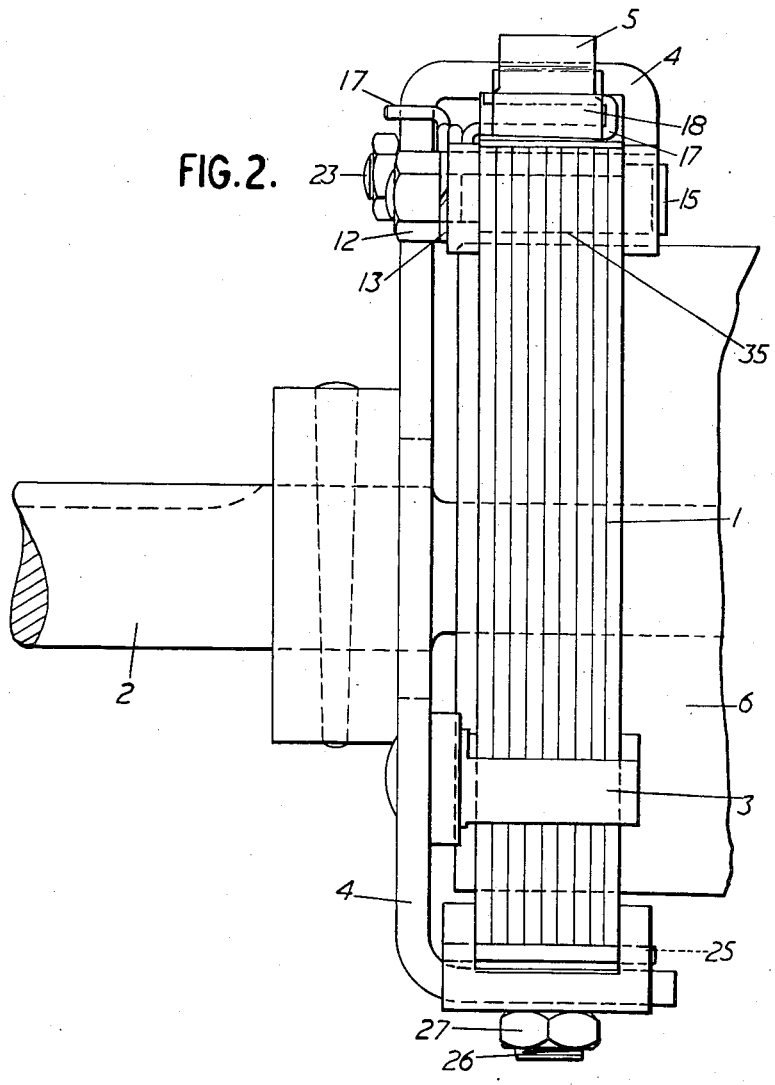
Figure 3:
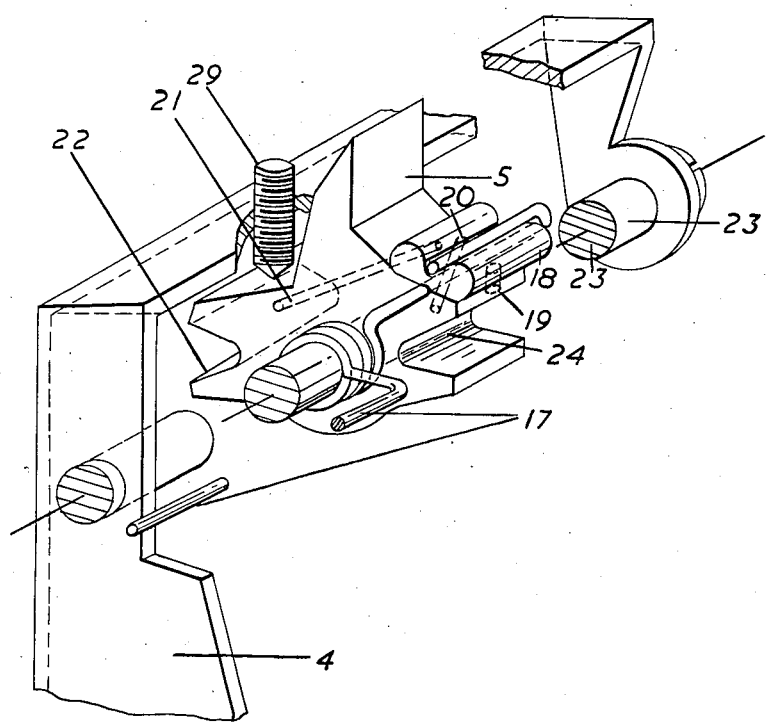

Other features of the clutch according to the present invention will appear from the following detailed description taken in conjunction with the accompanying drawings, in which:

FIG. 1 is a front elevation of the clutch, and
FIG. 2 is a side elevation of the clutch of FIG. 1.
FIG. 3 shows a detailed view of parts of the clutch.

Referring to the drawings there is shown a drum 6, which is constantly rotating and which is the driving member. A shaft 2 is the driven member and has mounted on it a back plate 4. The back plate 4 has three arms (shown dotted in FIG. 1), an anchor pin 3 being mounted on one arm and a pivot pin 23 on another. Furthermore two of the arms of the back plate 4 bend over the outside of the clutch for reasons which will be apparent from the later description.

The anchor pin 3 provides the mounting for a spring band 1 which is composed, in the embodiment shown, of nine laminations, but which may equally well be made in one piece. In the embodiment shown, the mounting of the spring band 1 on the anchor pin 3 is made at a point on the circumference of the spring band 1 which divides the spring band 1 into two lengths having a ratio one to another of 2:1. These two lengths are shown on FIG. 1 as portion 7 and portion 8 respectively.

The pivot pin 23 provides the pivot on which a lever stop arm 5 is arranged. The lever stop arm 5 controls the engagement and disengagement of the spring band 1 with the drum 6, as will be described later. Engaging in respective surfaces 22 and 24 on the lever stop arm 5 are two arms 10 and 14 which are pivoted on the ends of portions 7 and 8 respectively of the spring band 1 by screws 11 and 15. Each of the screws 11 and 15 has a portion which is threaded in the normal manner and which a nut 12 with a washer 13 can lock when the screw has been adjusted. There is, however, on each of the screws 11 and 15 an eccentric portion 35 (shown dotted in FIG. 2) and it is this portion 35 of each of the screws on which the respective arms 10 and 14 are pivoted. The position of the pivot for each arm 10 or 14 may therefore be adjusted relative to the pivot pin 23 and the lever stop arm 5 by turning the screws 11 and 15 in their respective bushes 9 and 16.

It is desirable that the effort required from the driver member to expand the spring band 1 shall be as small as possible. It is therefore preferable that the arrangement should be such that, when the spring band 1 is expanded, the movement should, as far as possible, be evenly distributed to provide a minimum clearance all round the drum 6. As the portion 7 of the band 1 is longer than the portion 8, this portion 7 should be moved further than the portion 8 to obtain the same clearance. Accordingly, the lever stop arm 5 is so designed that the bearing surface 22 is twice as far from the center of the pivot pin 23 as the bearing surface 24. Then, when the lever stop arm 5 is engaged by a stopping pawl (not shown), the portion 7 of the spring band 1 is moved twice as far as the portion 8.

A helical spring 17 is positioned around the pivot pin 23 and is arranged so that one end of it presses against the back plate 4 and the other end presses against a projection 36 on the lever stop arm 5. The spring 17 thus urges the lever stop arm 5 to move in an anticlockwise direction about the pivot pin 23 (as seen in FIG. 1), that is to say, the spring continually tends to move the lever stop arm 5 to allow the spring band 1 to contract to engage the drum 6.

At the end of the spring 17 which bears on projection 36 there is a piece of the spring bent back on itself (see FIG. 2) to form a clip. A felt pad 18 soaked in oil is held by this clip. Running through the lever stop arm 5 from the felt pad 18 to the bearing surfaces 22 and 24 and to the pivot pin 23 are holes 21, 19 and 20. These holes supply oil which creeps through them from the felt pad 18 onto the bearing surfaces 22 and 24 and the pivot pin 23.

In the detailed view of FIG. 3 the relative positions of the helical spring 17, lever stop arm 25, screw 29, and pad 18 are shown with respect to the back-plate 4 and pin 23 looking from the back-plate side of the clutch. In this figure there may also be seen the relative positions of the oil holes 21, 19 and 20 all with respect to the pad 18 and the bearing surfaces 22 and 24, and pin 23 respectively.

Fastened to the third arm of the back plate 4 through a screw 26 and a nut 27 is a guide 28. A thrust plate 25 is positioned by guide 28 and screw 26 on which the thrust plate 25 rests. The thrust plate 25 is provided to help to position the spring band 1 when this is expanded.

Screw 29 is purely a screw utilized for initial adjustment of the clutch and is shown holding the lever stop arm 5 in the position in which the spring band 1 is expanded. In order to adjust the clutch, the screw 29 is unscrewed until the lever stop arm 5 is in a position where it permits the spring band 1 to contract to take up a position with respect to drum 6 where it is in a half-contracted condition. The screw 26 is then screwed up until the spring band 1 is just touching the drum, and is then unscrewed very slightly, e.g. one eighth of a turn. Next the adjusting screw 11 is turned so that the eccentric portion 35 on which the arm 10 bears moves the arm 10 to the left so that it touches the bearing surface 22 and the adjusting screw 15 is also turned so that the eccentric portion 35 on which the arm 14 bears moves the arm 14 to the right so that it touches the bearing surface 24, both arms 10 and 14 being locked by nuts 12. Screw 29 is then unscrewed so that lever stop arm 5 can pivot about the pivot pin 23 under the influence of the helical spring 17 to allow the spring band 1 to contract through its natural resilience and grip drum 6.

When, during engagement and rotation of the clutch in an anti-clockwise direction, it is desired to disconnect the driven portion from the driving portion constituted by the drum 6, a stopping pawl 30 (FIG. 1) is interposed into the path of the lever stop arm 5. In consequence of this interposition the lever stop arm 5 is caused to pivot in a clockwise direction about the axis of its pivot pin 23 against the influence exerted on it by the helical spring 17 which urges it in an anti-clockwise direction. The pivotal movement of the lever stop arm 5 causes an anti-clockwise movement of the arms 14 and 10 about their pivot screws 15 and 11 respectively. It will readily be understood that as the spring band 1 is in a contracted state movement of the arms 14 and 10 in the directions stated will cause the spring band 1 to expand to the position shown in FIG. 1.

The driving and driven portions of the clutch are maintained out of engagement as long as the stopping pawl is retained in the interposed position, on its withdrawal therefrom the lever stop arm 5 is allowed to pivot in an anti-clockwise direction under the influence of the helical spring 17 whereupon arms 14 and 10 are caused to pivot in a clockwise direction on their pivot screws 15 and 11 respectively to enable the spring band 1 to contract by its natural resilience and grip the drum 6 constituting the driving member.

The driving drum 6 turns in an anti-clockwise direction (as seen in FIG. 1) during operation. The portion 7 of the spring band 1 therefore grips more tightly owing to servo action when the spring band 1 is being accelerated or a retarding force is applied to the driven member 2, and the portion 8 grips more tightly when the driven member 2 tends to over-run the driving drum 6.

While the principles of the invention have been described above in connection with specific embodiments, and particular modifications thereof, it is to be clearly understood that this description is made only by way of example and not as a limitation on the scope of the invention.

What I claim is:

1. A friction clutch comprising a cylindrical driving member, a driven member, a spring band having a fixing point and being supported relative to the driven member and positioned to frictionally engage the cylindrical surface of the driving member, the fixing point of the spring band being so situated that the latter is divided into two portions, a front portion and a rear portion, the ratio of the length of the front portion to the length of the rear portion being greater than 1:1 and not greater than 3:1, and means for controlling the engagement and disengagement of the clutch by movement of the said spring band, the said means comprising a lever stop arm pivotally mounted on said driven member and two arms pivotally mounted at respective opposite ends of the spring band for engaging respectively bearing surfaces on the said lever stop arm, the distances of the said respective bearing surfaces from the pivot of the lever stop arm being in the same ratio as the lengths of the said front and rear portions of the spring band the respective arms of which engage said bearing surfaces.

2. A friction clutch according to claim 1, wherein the pivotal mounting of each of said arms is adjustable, and wherein the clutch further comprises an adjustable plate against which the spring band may rest when in the expanded position.

References Cited in the file of this patent

UNITED STATES PATENTS

| | | |
|---|---|---|
| 1,081,528 | Gilson | Dec. 16, 1913 |
| 1,167,010 | Neel | Jan. 4, 1916 |
| 1,452,349 | Oberley et al. | Apr. 17, 1923 |
| 1,681,352 | Lichtenberg | Aug. 21, 1928 |
| 2,213,361 | Cardwell | Sept. 3, 1940 |
| 2,868,001 | Russell | Jan. 13, 1959 |